US012157316B2

(12) United States Patent
Nemoto

(10) Patent No.: US 12,157,316 B2
(45) Date of Patent: Dec. 3, 2024

(54) NOZZLE SURFACE RECOVERY DEVICE, LIQUID DISCHARGE DEVICE, AND INKJET PRINTER

(71) Applicant: Yusuke Nemoto, Kanagawa (JP)

(72) Inventor: Yusuke Nemoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 159 days.

(21) Appl. No.: 17/960,828

(22) Filed: Oct. 6, 2022

(65) Prior Publication Data

US 2023/0138040 A1 May 4, 2023

(30) Foreign Application Priority Data

Oct. 29, 2021 (JP) ................................ 2021-178082

(51) Int. Cl.
*B41J 2/165* (2006.01)

(52) U.S. Cl.
CPC ........ *B41J 2/16511* (2013.01); *B41J 2/16514* (2024.05); *B41J 2/16538* (2013.01)

(58) Field of Classification Search
CPC ................ B41J 2/16511; B41J 2/16538; B41J 2002/16514; B41J 2025/008; B41J 2/16508; B41J 2/16547; B41J 2/16585
See application file for complete search history.

(56) References Cited

U.S. PATENT DOCUMENTS

| | | | | |
|---|---|---|---|---|
| 2008/0231655 | A1* | 9/2008 | Yamada ............... | B41J 2/16511 347/29 |
| 2009/0058921 | A1 | 3/2009 | Habashi | |
| 2009/0179928 | A1 | 7/2009 | Nemoto et al. | |
| 2010/0182370 | A1 | 7/2010 | Nemoto et al. | |
| 2011/0221821 | A1 | 9/2011 | Asano et al. | |
| 2012/0062647 | A1 | 3/2012 | Nemoto | |

FOREIGN PATENT DOCUMENTS

| | | |
|---|---|---|
| JP | 2002-120386 | 4/2002 |
| JP | 2003-165205 | 6/2003 |
| JP | 2009-078539 | 4/2009 |
| JP | 2014-051015 | 3/2014 |
| JP | 2015-085601 | 5/2015 |
| JP | 2016-221796 | 12/2016 |

* cited by examiner

*Primary Examiner* — Justin Seo
*Assistant Examiner* — Tracey M McMillion
(74) *Attorney, Agent, or Firm* — XSENSUS LLP

(57) ABSTRACT

A nozzle surface recovery device includes: a cap configured to cap a nozzle surface of a liquid discharge head; a guide configured to guide the cap in a first direction; and a first position adjuster configured to adjust a position of the cap with respect to the nozzle surface in a second direction orthogonal to the first direction, and the first position adjuster including: a first roller rotatable along the guide to move the cap in the first direction between a capping position at which the cap caps the nozzle surface and a retraction position at which the cap is retracted from the capping position; and a first adjustment plate coupled to the first roller, the first adjustment plate configured to adjust the position of the cap with respect to the guide in the second direction.

20 Claims, 11 Drawing Sheets

NOZZLE SURFACE RECOVERY DEVICE, LIQUID DISCHARGE DEVICE, AND INKJET PRINTER

CROSS-REFERENCE TO RELATED APPLICATIONS

This patent application is based on and claims priority pursuant to 35 U.S.C. § 119 (a) to Japanese Patent Application No. 2021-178082, filed on Oct. 29, 2021, in the Japan Patent Office, the entire disclosure of which is hereby incorporated by reference herein.

BACKGROUND

Technical Field

The present embodiment relates to a nozzle surface recovery device, a liquid discharge device, and an inkjet printer.

Related Art

An inkjet printer as a liquid discharge apparatus includes a plurality of liquid discharge devices (C, M, Y, and K) that discharge ink while facing a conveyance drum and a conveyance belt that convey a recording medium. These liquid discharge devices each include a plurality of liquid discharge heads constituting a line head, and the nozzle surface of each liquid discharge head is always maintained in a preferable state by a nozzle surface recovery device so that clogging or the like will not occur with the lapse of time.

SUMMARY

A nozzle surface recovery device includes: a cap configured to cap a nozzle surface of a liquid discharge head; a guide configured to guide the cap in a first direction; and a first position adjuster configured to adjust a position of the cap with respect to the nozzle surface in a second direction orthogonal to the first direction, and the first position adjuster including: a first roller rotatable along the guide to move the cap in the first direction between a capping position at which the cap caps the nozzle surface and a retraction position at which the cap is retracted from the capping position; and a first adjustment plate coupled to the first roller, the first adjustment plate configured to adjust the position of the cap with respect to the guide in the second direction.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
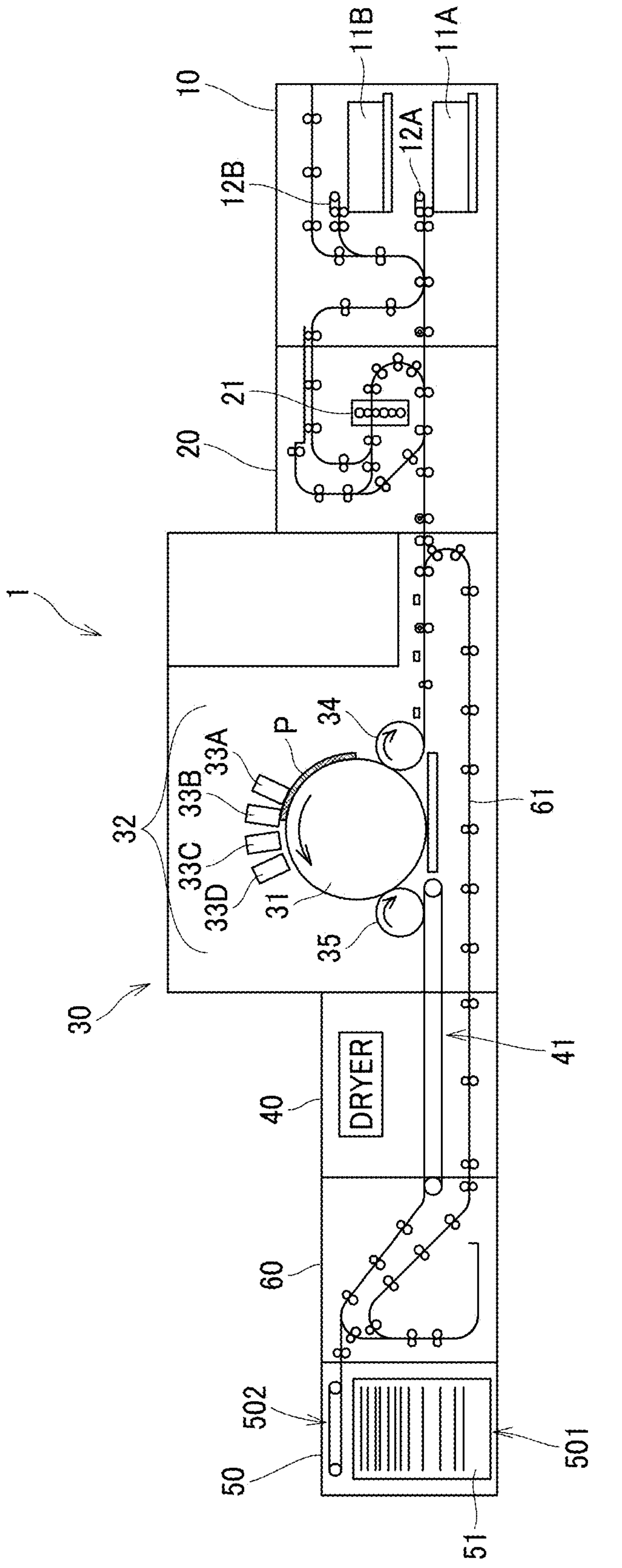
FIG. 1 is a schematic view of an inkjet printer according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

[Inkjet Printer]

The following is a description of the present embodiment, with reference to the accompanying drawings. FIG. 1 is a schematic view of a line-head-type inkjet printer 1 as a liquid discharge apparatus. The inkjet printer 1 includes a feeder 10 that introduces a sheet material P as an application target (a recording medium) to which liquids are to be applied, a pretreatment device 20, a printer 30, a dryer 40, a sheet receiver 50, and a reversing mechanism 60.

The inkjet printer 1 gives (applies) a pretreatment liquid to the sheet material P conveyed (supplied) from the feeder 10 with the pretreatment device 20, as necessary. After that, liquids are applied to the sheet material P with the printer 30 to perform required printing. After drying the liquids adhering to the sheet material P with the dryer 40, the sheet material P is ejected to the sheet receiver 50.

The feeder 10 includes feed trays 11 (a lower feed tray 11A and an upper feed tray 11B) that store a plurality of sheet materials P, and feeding devices 12 (12A and 12B) that separate and feed the sheet materials P one by one from the feed trays 11. The sheet materials P are supplied from the feeder 10 to the pretreatment device 20. The pretreatment device 20 includes an applicator 21 that is a treatment liquid applicator that aggregates the coloring material of ink, for example, and applies a treatment liquid having the effect of preventing the ink from bleeding through the sheet, onto the printing surface of the sheet material P.

The printer 30 includes a conveyance drum 31 that is a carrying member (a rotating member) that carries the sheet material P on its peripheral surface and rotates, and a droplet discharger 32 that discharges liquids toward the sheet material P being carried by the conveyance drum 31. The printer 30 also includes a transfer cylinder 34 that receives the sheet material P sent from the pretreatment device 20 and transfers the sheet material P to the conveyance drum 31, and a transfer cylinder 35 that receives the sheet material P conveyed by the conveyance drum 31 and transfers the sheet material P to the dryer 40.

The sheet material P conveyed from the pretreatment device 20 to the printer 30 is gripped at the top edge by a gripper (a sheet gripper) provided on the transfer cylinder 34, and is conveyed as the transfer cylinder 34 rotates. The sheet material P conveyed by the transfer cylinder 34 is transferred to the conveyance drum 31 at a position where the sheet material P faces the conveyance drum 31.

A gripper (a sheet gripper) is also provided on the surface of the conveyance drum 31, and the sheet material P is gripped at the top edge by the gripper (sheet gripper). A plurality of suction holes is dispersedly formed in the surface of the conveyance drum 31, and a suction airflow directed inward from predetermined suction holes of the conveyance drum 31 is generated by a suction means. The sheet material P transferred from the transfer cylinder 34 to the conveyance drum 31 is then gripped at the top edge by the sheet gripper, and is attracted and carried on the conveyance drum 31 by the suction airflow generated by the suction means. The sheet material P is further conveyed as the conveyance drum 31 rotates.

The droplet discharger 32 includes four liquid discharge devices 33 (33A to 33D) that discharge droplets. The liquid discharge devices 33 (33A to 33D) are arranged radially, at equal intervals, and symmetrically in FIG. 1, along the upper outer periphery of the conveyance drum 31.

The liquid discharge device 33A can discharge a cyan (C) liquid, the liquid discharge device 33B can discharge a magenta (M) liquid, the liquid discharge device 33C can discharge a yellow (Y) liquid, and the liquid discharge device 33D can discharge a black (K) liquid. It is also possible to use a liquid discharge device that discharges a special liquid such as a white or gold (silver) liquid.

A discharge operation of each of the liquid discharge devices 33 of the droplet discharger 32 is controlled by a drive signal corresponding to print information. When the sheet material P carried on the conveyance drum 31 passes through the region facing the droplet discharger 32, the liquids of the respective colors are discharged from the liquid discharge devices 33, and an image corresponding to the print information is printed.

The sheet material P onto which the liquids have been applied by the droplet discharger 32 is transferred from the conveyance drum 31 to the transfer cylinder 35, and the sheet material P received by the transfer cylinder 35 is then transferred to a conveyance mechanism 41 and is conveyed to the dryer 40 (a heater). The dryer 40 dries the liquids that have been applied onto the sheet material P by the printer 30. As a result, the liquid component such as moisture in the liquids evaporates, and the colorants contained in the liquids are fixed onto the sheet material P. Also, curling of the sheet material P is prevented.

The reversing mechanism 60 is a mechanism that reverses the sheet material P in a switchback manner when double-sided printing is performed on the sheet material P that has passed through the dryer 40. The reversed sheet material P is reversely sent to the upstream side of the transfer cylinder 34 through a conveyance path 61 in the printer 30.

The sheet receiver 50 includes a sheet catch tray 51 on which a plurality of sheet materials P is stacked, and a sheet conveyance device 502. The sheet materials P conveyed through the reversing mechanism 60 are sequentially stacked and stored in a stacker 501.

[Liquid Discharge Devices]

Figure 2:
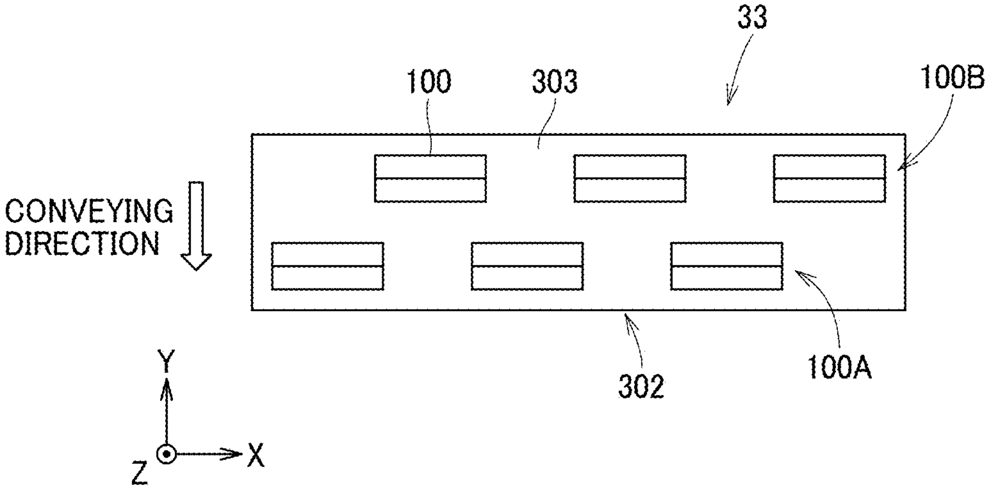
FIG. 2 is a plan view of a liquid discharge device as viewed from the opposite side of nozzle surfaces.
Figure 3:
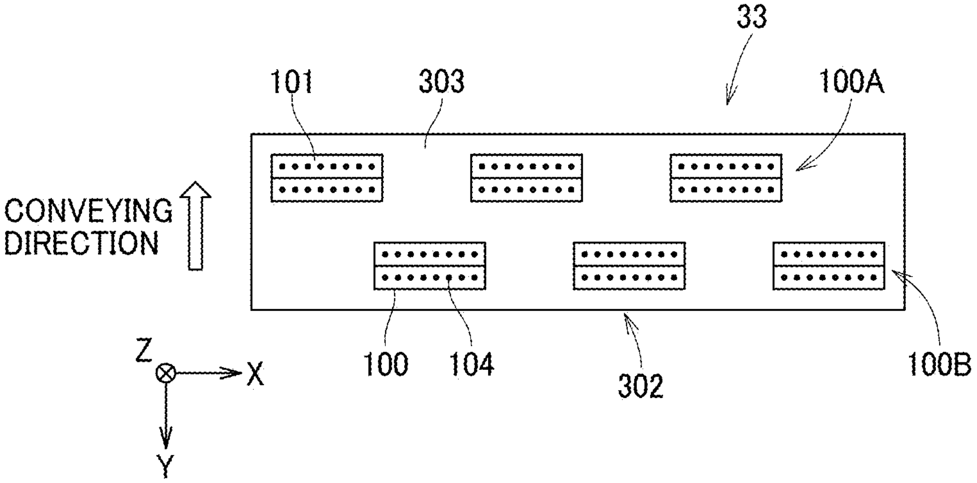
FIG. 3 is a plan view of the liquid discharge device as viewed from the side of the nozzle surfaces.
Figure 4:
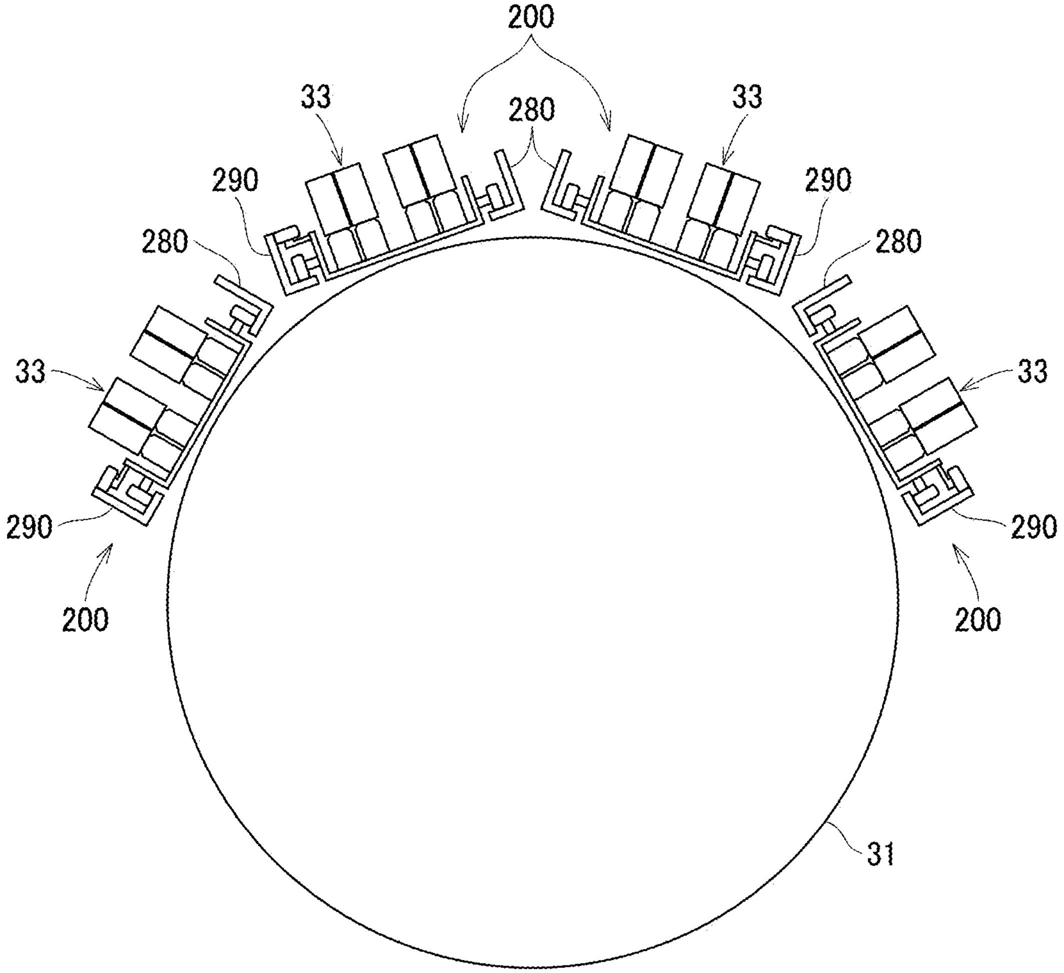
FIG. 4 is a front view of a conveyance drum.

Next, the liquid discharge devices 33 described above are further described. FIG. 2 is a plan view of a liquid discharge device 33 as viewed from the nozzle surface side. FIG. 3 is a plan view of the liquid discharge device 33 as viewed from the side opposite to the nozzle surface. FIG. 4 is a view of a plurality of liquid discharge devices 33 disposed on the outer periphery of the conveyance drum 31.

The liquid discharge device 33 is formed by arranging a plurality of heads 100 that discharge a liquid on a head mounting member 302 in a staggered manner (a line head type). One of the rows of heads 100 arranged in a staggered manner is referred to as a head row 100A, and the other row is referred to as a head row 100B. The present embodiment can also be applied in a case where the head mounting member 302 has one head row, instead of a staggered layout of heads.

A head 100 includes a plurality of nozzle rows in which a plurality of nozzles 104 that discharge a liquid is arranged (there are two rows herein, but the number of rows is not limited to two). Here, a "liquid discharge head" is a functional component that discharges/jets a liquid from nozzles. The liquid to be discharged is not limited to any particular liquid as long as the liquid has viscosity or surface tension to allow the liquid to be discharged from the head. However, the viscosity of the liquid is preferably not higher than 30 mPa·s at ordinary temperatures and pressures, or by heating or cooling.

More specific examples of the liquid include a solution, a suspension, or an emulsion that contains a solvent such as water or an organic solvent, a colorant such as dye or pigment, a functional material such as a polymerizable compound, a resin, or a surfactant, a biocompatible material such as deoxyribonucleic acid (DNA), amino acid, protein, or calcium, or an edible material such as a natural colorant.

Such a solution, a suspension, or an emulsion is used for inkjet ink, a surface treatment solution, a liquid for forming components of an electronic element and a light-emitting element or a resist pattern of an electronic circuit, or a material solution for three-dimensional molding, for example.

Examples of the energy source that generates the energy for discharging a liquid include piezoelectric actuators (stacked piezoelectric elements and thin-film piezoelectric elements), thermal actuators that use thermoelectric conversion elements such as heating resistors, and static actuators each including a diaphragm and opposed electrodes.

In the present application, a "liquid discharge apparatus" is an apparatus that includes liquid discharge beads or liquid discharge units, and drives the liquid discharge heads to discharge a liquid. Examples of the "liquid discharge apparatus" include not only apparatuses capable of discharging a liquid to a material to which a liquid can adhere, but also apparatuses that discharge a liquid into a gas or into a liquid.

The "liquid discharge apparatus" may include means relating to feeding, conveyance, and sheet ejection of a material to which a liquid can adhere, and also include a pretreatment device and a posttreatment device.

For example, the "liquid discharge apparatus" may be an image forming apparatus that forms an image on a paper sheet by discharging ink, or a three-dimensional molding apparatus that discharges a molding liquid to a powder layer in which powder materials are formed in layers, so as to mold a three-dimensional object.

The "liquid discharge apparatus" is not necessarily an apparatus that discharges a liquid to visualize meaningful images, such as letters or figures. For example, the "liquid discharge apparatus" may be an apparatus that forms meaningless images such as meaningless patterns, or an apparatus that molds three-dimensional images.

The above "material to which a liquid can adhere" means a material to which a liquid can adhere at least temporarily, a material to which a liquid adheres and is fixed, or a material into which a liquid adheres and permeates. Specific examples of the "material to which a liquid can adhere" include a recording medium such as a paper sheet, recording paper, a recording sheet of paper, a film, or cloth, an electronic component such as an electronic substrate or a piezoelectric element, and a medium such as layered powder, an organ model, or a testing cell. Examples of the "material to which a liquid can adhere" include any material to which a liquid adheres, unless particularly specified.

The above-mentioned "material to which a liquid can adhere" may be any material to which a liquid can temporarily adhere, such as paper, thread, fiber, cloth, leather, metal, plastic, glass, wood, or ceramics.

Meanwhile, a "liquid" may be any liquid that has viscosity or surface tension so that the liquid can be discharged from the head. However, the viscosity of the liquid is preferably not greater than 30 mPa·s at ordinary temperatures and pressures, or by heating or cooling.

More specific examples of the liquid include a solution, a suspension, or an emulsion that contains a solvent such as water or an organic solvent, a colorant such as dye or pigment, a functional material such as a polymerizable compound, a resin, or a surfactant, a biocompatible material such as deoxyribonucleic acid (DNA), amino acid, protein, or calcium, or an edible material such as a natural colorant.

Such a solution, a suspension, or an emulsion is used for inkjet ink, a surface treatment solution, a liquid for forming components of an electronic element and a light-emitting element or a resist pattern of an electronic circuit, or a material solution for three-dimensional molding, for example.

The "liquid discharge apparatus" is an apparatus in which a liquid discharge head and a material to which a liquid can adhere move relative to each other, but is not limited to this. Specific examples of such apparatuses include a serial-type apparatus that moves liquid discharge heads, a line-type apparatus that does not move liquid discharge heads, and the like.

Examples of the "liquid discharge apparatus" further include a treatment liquid applying apparatus that discharges a treatment liquid to a sheet to apply the treatment liquid onto a sheet surface so as to reform the sheet surface, and an injection granulation apparatus in which a composition liquid including raw materials dispersed in a solution is discharged through nozzles to granulate fine particles of the raw materials.

[Nozzle Surface Recovery Device]

Next, a nozzle surface recovery device 200 according to the present embodiment is described, with reference to FIGS. 4 to 9). As illustrated in FIG. 4, the nozzle surface recovery device 200 is moved in the axial direction of the conveyance drum 31 (the forward/backward direction in the paper surface of FIG. 4), to be inserted into a gap between the liquid discharge devices 33 and the outer peripheral surface of the conveyance drum 31.

As illustrated in FIGS. SA to 5C, the nozzle surface recovery device 200 includes an elongated rectangular substrate 210, a plurality of caps 240 that are attached to and cover (cap) the nozzle surfaces 101 of the liquid discharge devices 33, and wipers 250 and webs 260 that wipe the nozzles of the liquid discharge devices 33.

The number of the caps 240 provided therein is the same as the number of the nozzle surfaces 101 of the liquid discharge devices 33. As for the nozzle surfaces 101 of the liquid discharge devices 33, each head 100 has two adjacent surfaces, the surfaces are arranged at six locations in two rows in a staggered manner as illustrated in FIG. 3. Like the nozzle surfaces 101 in the staggered layout, each two caps 240 forms a pair, and the caps 240 are arranged at six locations in two rows in a staggered manner.

Each cap 240 is connected to a waste liquid tank via a waste liquid pump. In a state where the caps 240 are attached to and cover the nozzle surfaces 101 of the liquid discharge devices 33, ink is discharged from the nozzles into the caps 240, to clean clogging of the nozzles and the like. The discharged ink is sent to the waste liquid tank via the waste liquid pump.

The wipers 250 are formed with a pair of right and left elastic plates that vertically stand on the substrate 210. These wipers 250 are disposed on the front end side of the caps 240 at six locations in two rows.

The webs 260 are formed with a pair of right and left non-woven fabric members or the like that are disposed on the substrate 210 and have liquid absorbing properties. These webs 260 are disposed on the front side of the wipers 250.

Both sides (the long sides) of the substrate 210 are bent upward into an L shape, to form a pair of vertical side plates 211. Both ends of one of the side plates 211 in the longitudinal direction are partially cut and are horizontally extended outward to form bracket portions 212.

First rollers 220 for supporting the nozzle surface recovery device 200 in the height direction are pivotally supported at both longitudinal ends of the right and left side plates 211. Also, the rotating shafts 231 of second rollers 230 for supporting the nozzle surface recovery device 200 in the transverse direction are pivotally supported by the bracket portions 212 of the one of the side plates 211. The first rollers 220 and the second rollers 230 form guided members to be guided by guide rails 280 and 290 described later.

Figure 6A:
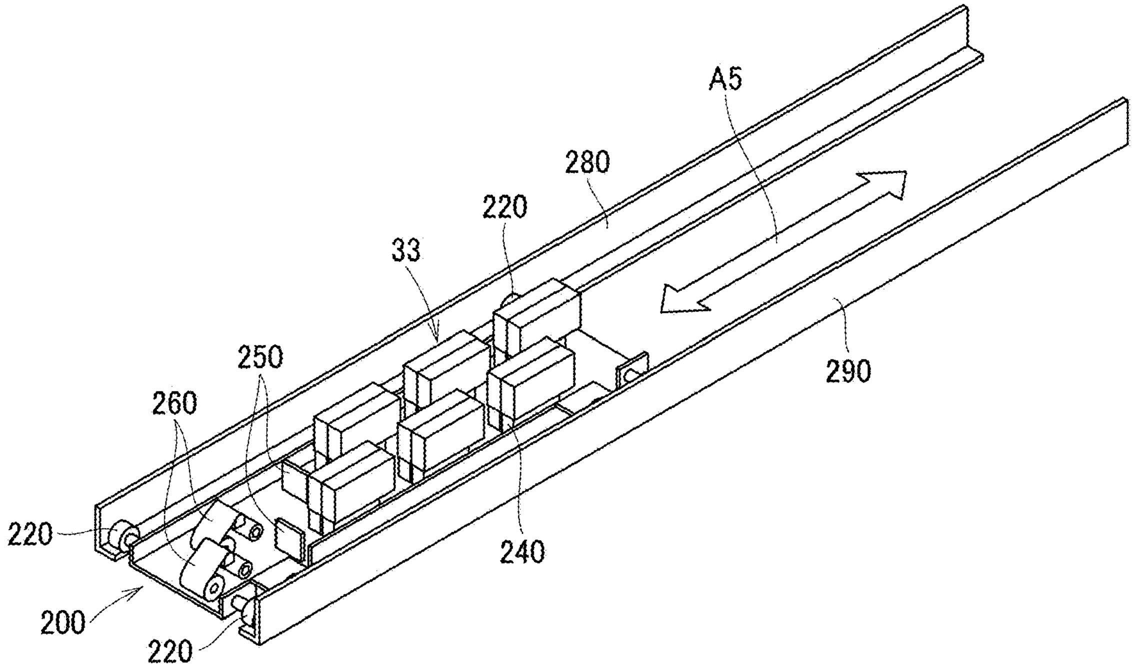
FIG. 6A is a perspective view of the nozzle surface recovery device moved below the liquid discharge devices.
Figure 6B:
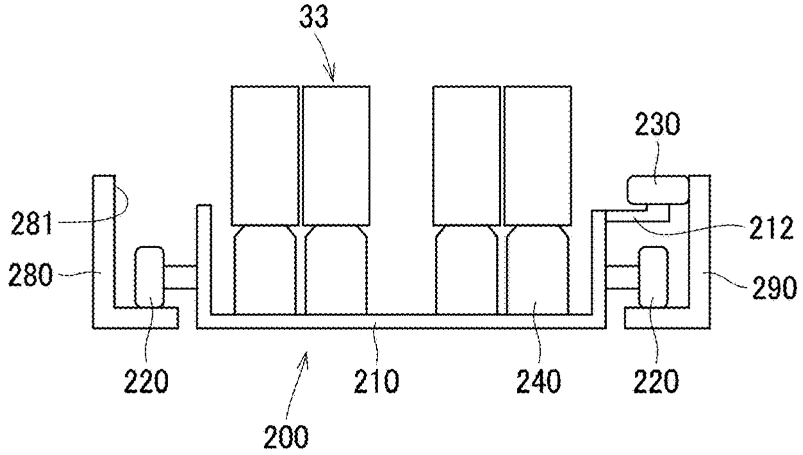
FIG. 6B is a front view of the nozzle surface recovery device moved below the liquid discharge devices.

These first rollers 220 and the second rollers 230 can roll along a pair of right and left guide rails 280 and 290 that are guide members illustrated in FIGS. 6A and 6B. The guide rails 280 and 290 are fixed to the machine frame of the printer 30 illustrated in FIG. 1. The longitudinal direction of the guide rails 280 and 290 is parallel to the axial direction of the conveyance drum 31 (the forward/back ward direction of the paper surface of FIG. 4). The nozzle surface recovery device 200 can move back and forth along the pair of right and left guide rails 280 and 290.

Figure 5A:
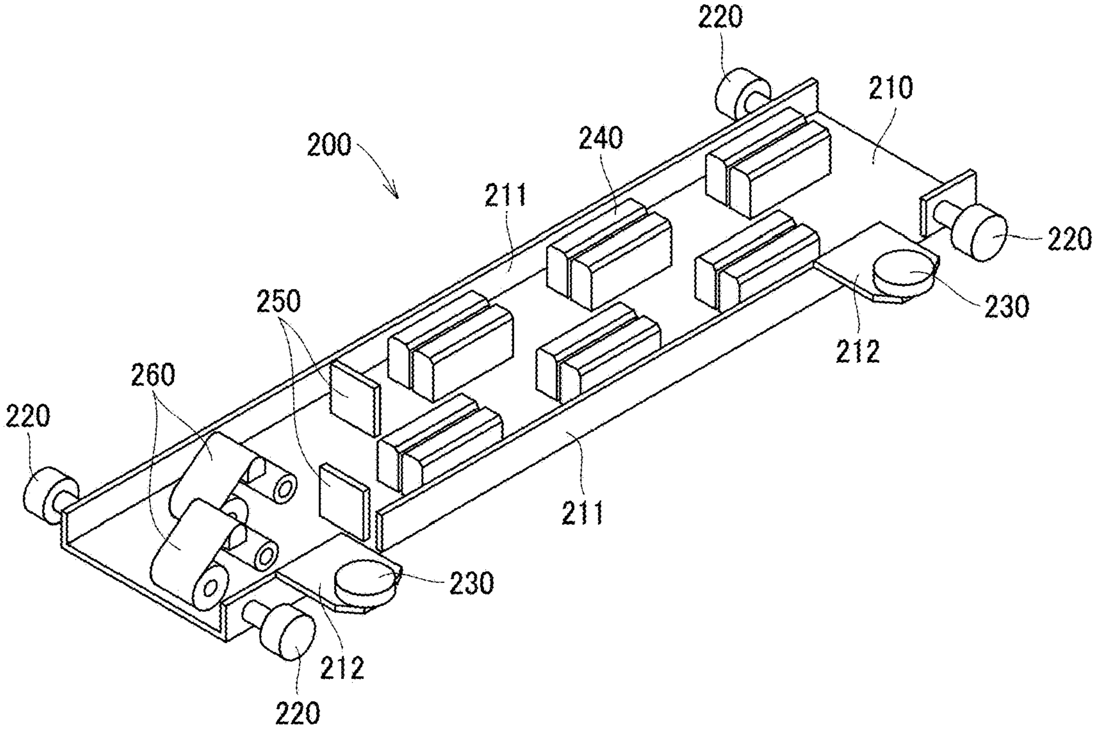
FIG. 5A is a perspective view of a nozzle surface recovery device.
Figure 5B:
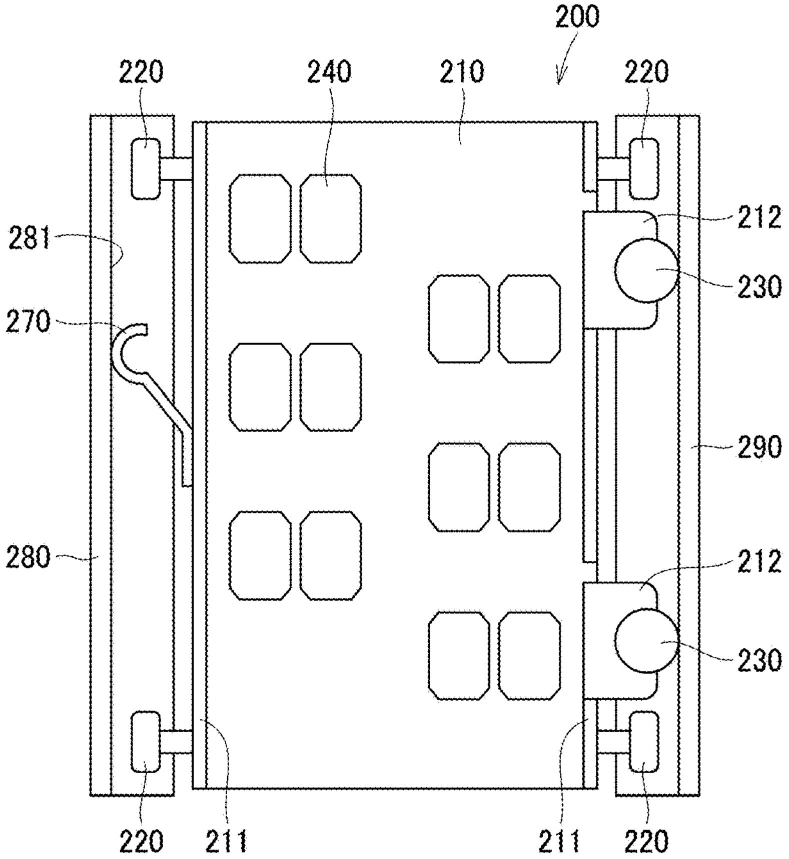
FIG. 5B is a simplified plan view of the nozzle surface recovery device.
Figure 5C:
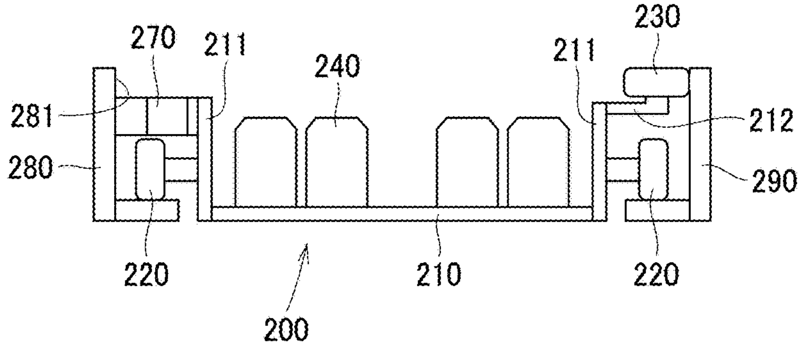
FIG. 5C is a simplified front view of the nozzle surface recovery device.

Specifically, as illustrated in FIGS. 5B and 5C, the first rollers 220 are capable of rolling on the horizontal bottom plate portions of the right and left guide rails 280 and 290 each having an L-shaped cross section, and the second rollers 230 are capable of rolling on the inside surface of the vertical side plate of the guide rail 290 on one side. In FIGS. 5B and 5C, the wipers 250 and the webs 260 are not illustrated.

As illustrated in FIGS. 5B and 5C, a plate spring 270 that is in sliding contact with the inside surface 281 of the vertical side plate of the guide rail 280 can be attached to the outside surface of the side plate 211 on the opposite side of the second rollers 230, as necessary. The top edge of the plate spring 270 pushes the inside surface 281 of the vertical side plate of the guide rail 280, so that the second rollers 230 can be prevented from floating up from the guide rail 290, regardless of the direction of tilt of the nozzle surface recovery device 200 in FIG. 4.

When the second rollers 230 of the nozzle surface recovery device 200 are disposed on one side in the direction of gravity as illustrated in FIGS. 4 and 5, the second rollers 230 can be pressed against the guide rail 290 by the weight of the nozzle surface recovery device 200, even without the plate spring 270. As a result, a positional shift of the caps 240 in a direction that is parallel to the nozzle surfaces 101 of the liquid discharge devices 33 and is perpendicular to the guide rails 280 and 290 can be accurately adjusted by second adjustment plates 232 of a second position adjuster 400 described later.

As illustrated in FIGS. 6A and 6B, the nozzle surface recovery device 200 is disposed so that the upper end positions of the caps 240 of the nozzle surface recovery device 200 accurately match the positions of the nozzle surfaces 101 (lower surfaces) of the liquid discharge devices 33 raised in the height direction. Accordingly, the nozzle surface recovery device 200 is moved in an A5 direction in FIG. 6A, so that the caps 240 of the nozzle surface recovery device 200 can be attached to and cover the nozzle surfaces 101 of the liquid discharge devices 33 without any gap. The caps 240 and the nozzle surfaces 101 are aligned by first and second position adjuster 400*s* described later.

The upper end positions of the wipers 250 and the webs 260 are set slightly higher than the upper end positions of the caps 240. Accordingly, when the nozzle surface recovery device 200 is moved from the retraction position to the capping position as illustrated in FIGS. 9B and 9C described later, the webs 260 and the wipers 250 wipe the plurality of nozzle surfaces 101 of the liquid discharge devices 33.

[First Position Adjuster 300]

Figure 7A:
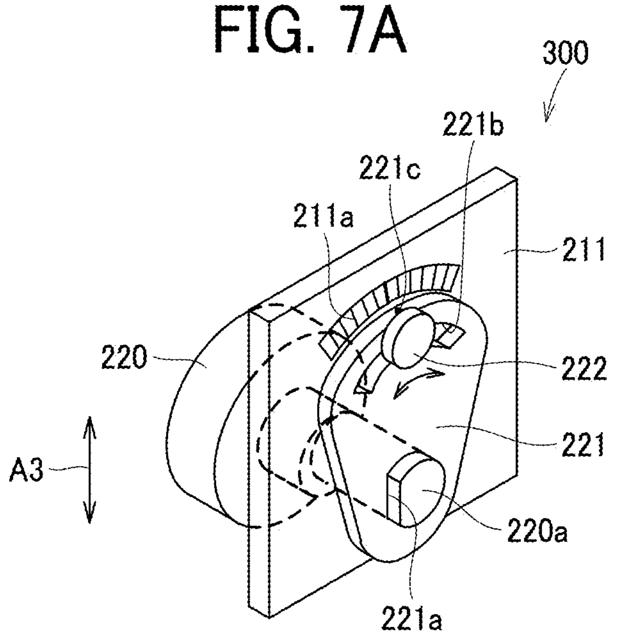
FIG. 7A is a perspective view of a first position adjuster 300 for rollers to be used in the nozzle surface recovery device.
Figure 7B:
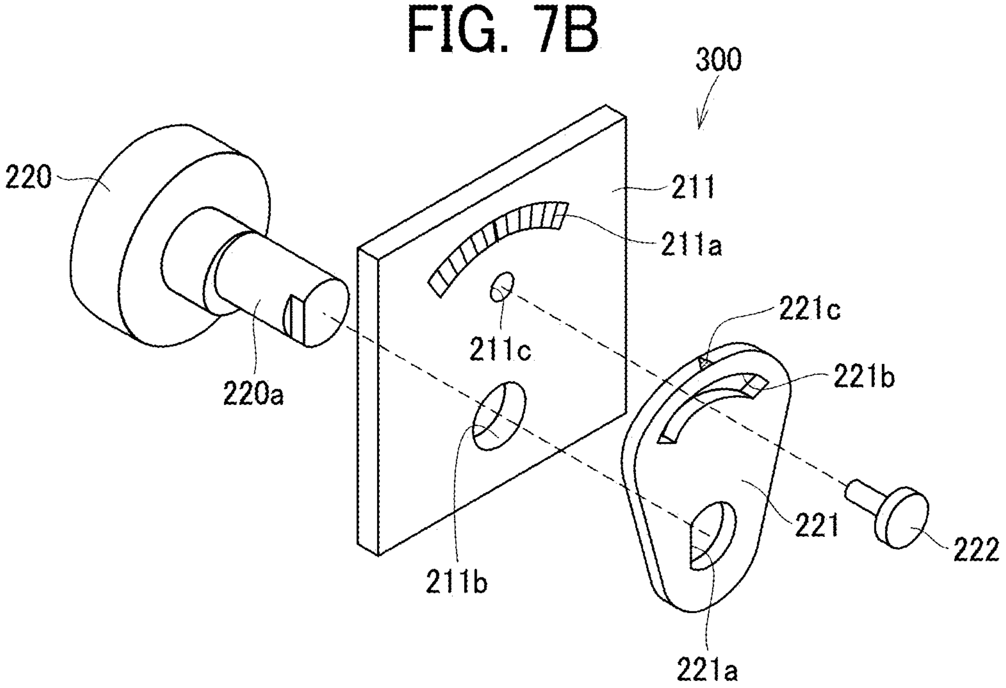
FIG. 7B is an exploded perspective view of the first position adjuster 300 for rollers to be used in the nozzle surface recovery device.

The positions of the first rollers 220 disposed at the four corners (the front right, rear right, front left, and rear left corners) of the nozzle surface recovery device 200 in FIGS. SA and SB can be adjusted in the height direction (A3 direction) by the first position adjuster 300 as illustrated in FIGS. 7A and 7B. Specifically, an eccentric shaft 220*a* integrally connected to the rotating shaft of a first roller 220 is fitted in a shaft hole 211*b* formed in the corresponding side plate 211 of the substrate 210. The axis of the rotating shaft of the first roller 220 is eccentric with respect to the axis of the eccentric shaft 220*a* by a predetermined distance.

The end portion of the eccentric shaft 220*a* on the opposite side of the first roller 220 is cut in a D-like shape, to be rotationally joined to a fan-shaped first adjustment plate 221. The eccentric shaft 220*a* cut in a D-like shape is then inserted into and joined to a D-shaped shaft hole 221*a* of the first adjustment plate 221.

An arc-like elongated hole 221*b* centered on the shaft hole 221*a* is formed in the arcuate portion of the fan-shaped first adjustment plate 221. As a fixing screw 222 inserted in this elongated hole 221*b* is screwed into a screw hole 211*c* of the side plate 211, the rotational position of the first adjustment plate 221 about the eccentric shaft 220*a* can be secured.

On the inside surface of the side plate 211, an arc-like adjustment scale 211*a* is formed by engraving or printing along the arcuate portion of the first adjustment plate 221. Meanwhile, a triangular mark 221*c* is formed in the arcuate portion of the first adjustment plate 221, so that the rotational position of the first adjustment plate 221 can be checked with the position indicated by the triangular mark 221*c* on the adjustment scale 211*a*.

Since the eccentric shaft 220*a* is eccentric with respect to the rotating shaft (the shaft center) of the first roller 220, the eccentric shaft 220*a* and the first adjustment plate 221 are rotationally moved, so that the height position of the first roller 220 in the A3 direction in FIG. 7A can be checked and adjusted. That is, the first adjustment plates 221 constitute the first position adjuster 300 that moves the first rollers 220 serving as guided member, so as to adjust the relative heights of the nozzle surfaces 101 and the caps 240.

[Second Position Adjuster 400]

Figure 8A:
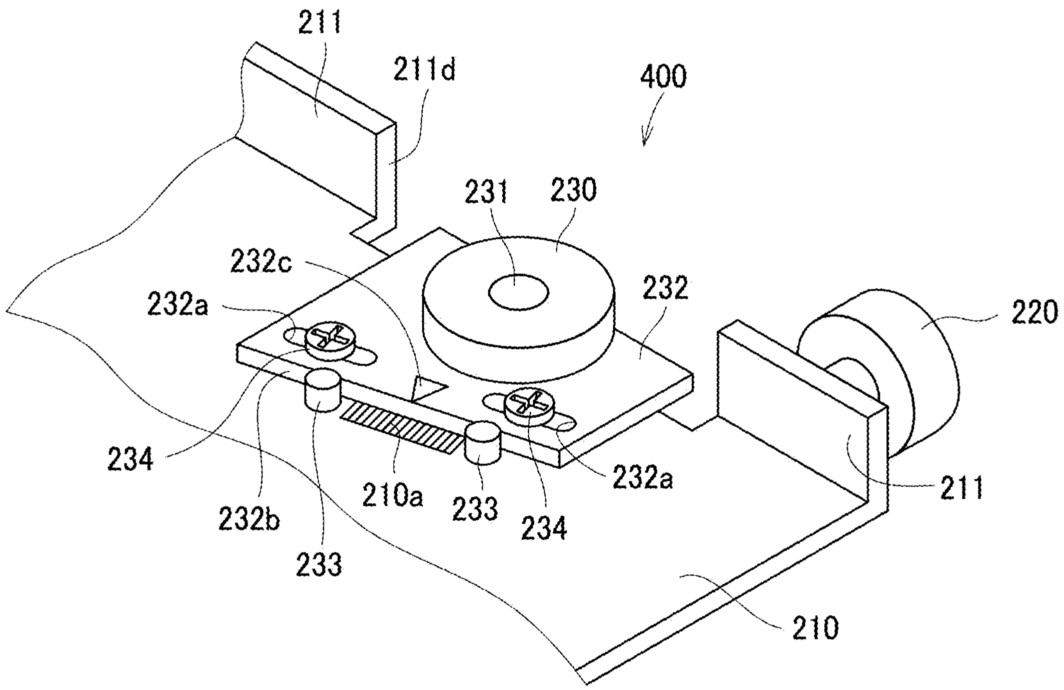
FIG. 8A is a perspective view of a second position adjuster 400 for rollers to be used in the nozzle surface recovery device.
Figure 8B:
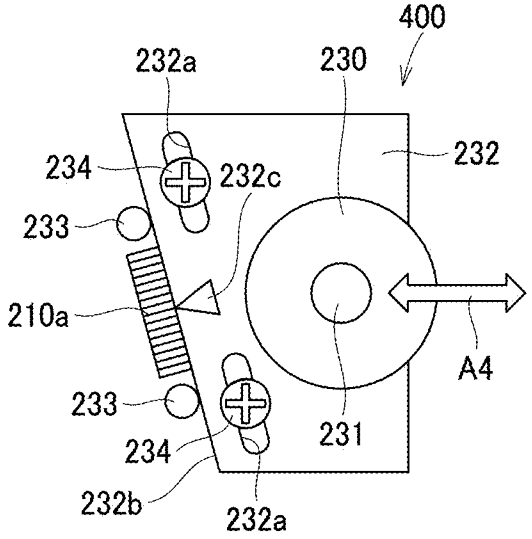
FIG. 8B is a plan view of the second position adjuster 400 for rollers to be used in the nozzle surface recovery device.

The rotating shafts of the second rollers 230 described above can be pivotally supported directly by the bracket portions 212 as described with reference to FIG. 5A, but can also be supported so as to be positionally adjustable in a lateral direction (A4 direction) by the second position adjuster 400 having second adjustment plates 232 as illustrated in FIGS. 8A and 8B. Specifically, the second adjustment plates 232 are provided in place of the bracket portions 212 of a side plate 211 of the substrate 210, and the rotating shafts 231 of the second rollers 230 are pivotally supported by the second adjustment plates 232. Part of the outer peripheral portion of a second roller 230 protrudes from a cutout portion 211*d* formed in the side plate 211 to the outside of the substrate 210, and is in contact with the inside surface of the vertical side plate of the guide rail 290.

A second adjustment plate 232 has a pair of elongated holes 232*a* and a linear sloped portion 232*b*. Screws 234 are inserted into the pair of elongated holes 232*a* and are fastened to the substrate 210, so that the second adjustment plate 232 can be secured to the substrate 210.

The sloped portion 232*b* is tilted with respect to the moving direction (a vertical direction in FIG. 8B) of the nozzle surface recovery device 200. The direction of this tilt may be the reverse. Meanwhile, a pair of guide pins 233 is fixedly disposed on the substrate 210. The sloped portion 232*b* of the second adjustment plate 232 slides with the pair of guide pins 233 in a state where the screws 234 is loosened, so that the second adjustment plate 232 can move in the direction of the sloped portion 232*b*. The guide pins 233 are also referred to as a "plate guide".

An adjustment scale 210*a* is formed by engraving or printing on the surface of the substrate 210 between the pair of guide pins 233. Meanwhile, a triangular mark 232*c* is formed at the center in the longitudinal direction of the sloped portion 232*b* of the second adjustment plate 232.

The slide position of the second adjustment plate 232 and the position of the second roller 230 in the A4 direction can be checked and adjusted in accordance with the position indicated by this triangular mark 232*c* on the adjustment scale 210*a*. That is, the second adjustment plates 232 constitute the second position adjuster 400 that moves the second rollers 230 serving as guided members, so as to adjust a positional shift of the caps 240 in a direction that is parallel to the nozzle surfaces 101 and is perpendicular to the guide rails 280 and 290.

[Nozzle Surface Recovery Process]

The nozzle surface recovery device 200 is designed as described above, and the nozzle surfaces 101 of the liquid discharge devices 33 are recovered (cleaned) with the nozzle surface recovery device 200. The procedures in the recovery process are as follows.

Figure 9A:
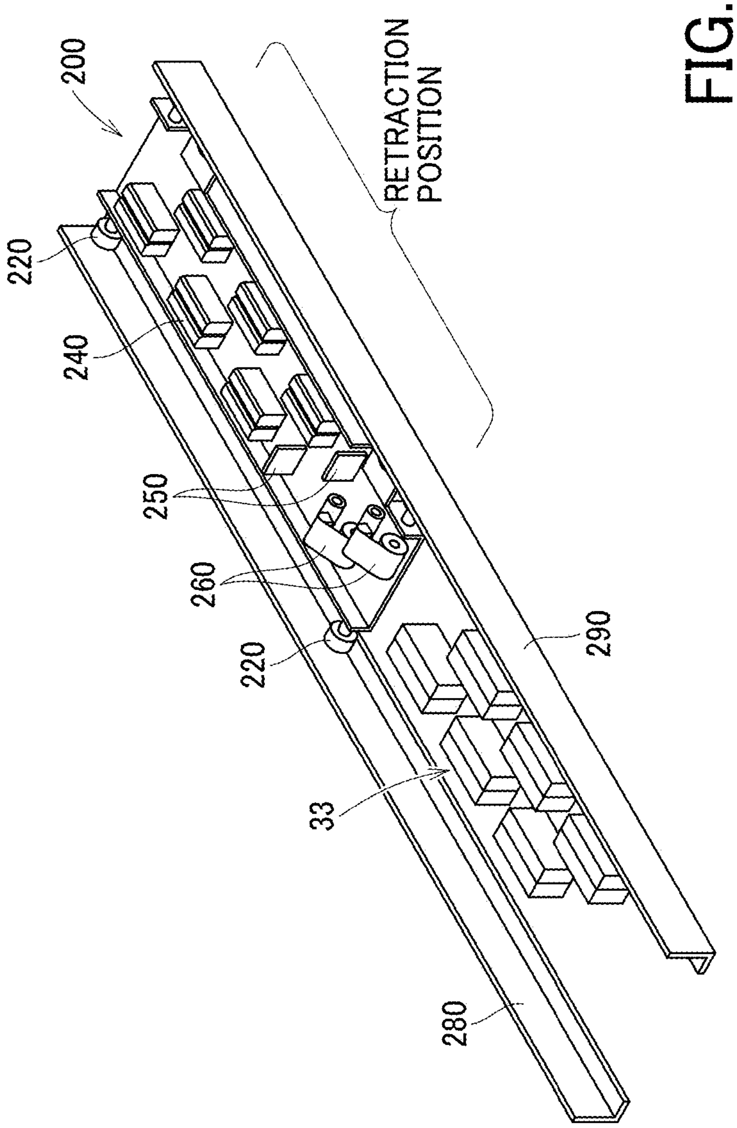
FIGS. 9A and 9B are a perspective view and a front view of the liquid discharge devices at lowered positions and the nozzle surface recovery device at a retraction position, respectively.
Figure 9B:
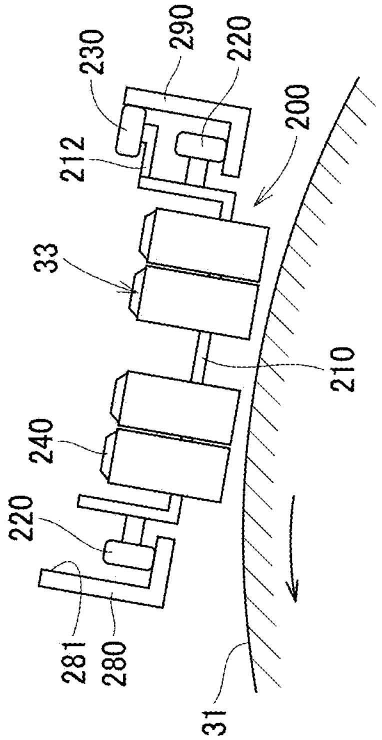
Figure 9C:
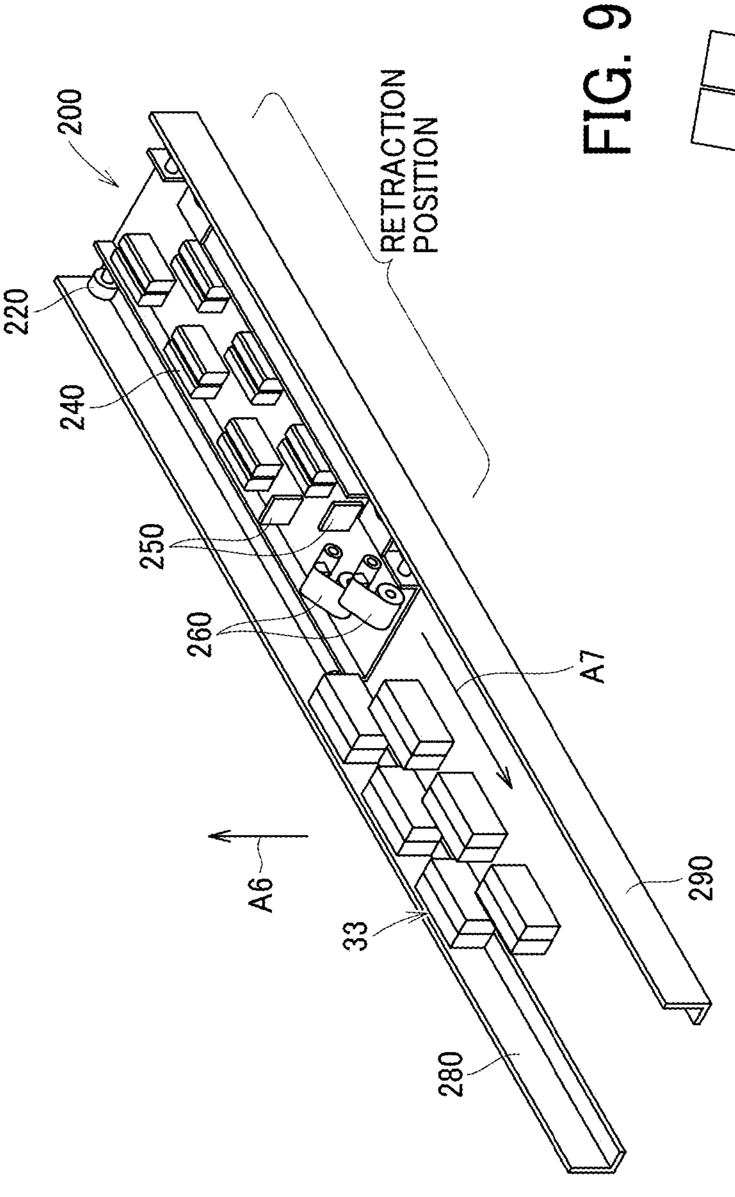
FIGS. 9C and 9D are a perspective view and a front view of the liquid discharge devices at lifted positions and the nozzle surface recovery device at the retraction position, respectively.

While the inkjet printer 1 is operating (performing printing), the nozzle surface recovery device 200 is located at a retraction position at the ends of the guide rails 280 and 290 as illustrated in FIGS. 9A and 9B. At this retraction position, the nozzle surface recovery device 200 is separated from the gap between the liquid discharge devices 33 and the conveyance drum 31 toward the front side in the axial direction of the conveyance drum 31.

In the state illustrated in FIGS. 9A and 9B, liquids (inks) discharged from the nozzles of the liquid discharge devices 33 are discharged toward a recording medium held on the outer peripheral surface of the conveyance drum 31, and required printing is performed. The distance between the nozzle surface recovery device 200 at the retraction position and the liquid discharge devices 33 may be the shortest necessary distance to minimize the length of the guide rails 280 and 290, and miniaturize the nozzle surface recovery device 200.

Figure 9D:
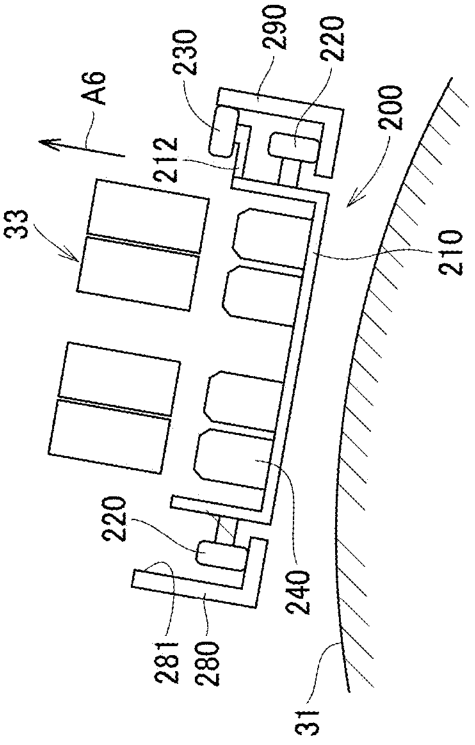

When the nozzles of the liquid discharge devices 33 are cleaned, the rotation of the conveyance drum 31 is stopped, and the liquid discharge devices 33 are first lifted up (in an A6 direction) by a lifting mechanism as illustrated in FIGS. 9C and 9D. This lifting operation is performed to form a space into which the nozzle surface recovery device 200 can be inserted, between the liquid discharge devices 33 and the outer peripheral surface of the conveyance drum 31.

After the liquid discharge devices 33 are lifted up, the nozzle surface recovery device 200 is moved (slid) forward in an A7 direction toward the space formed between the liquid discharge devices 33 and the outer peripheral surface of the conveyance drum 31. At this point of time, the distance by which the nozzle surface recovery device 200 is moved forward is substantially the length in the moving direction of the nozzle surface recovery device 200. During the forward movement of the nozzle surface recovery device 200, the plurality of nozzle surfaces 101 of the liquid discharge devices 33 can be preliminarily wiped with the webs 260 and the wipers 250.

Figure 9E:
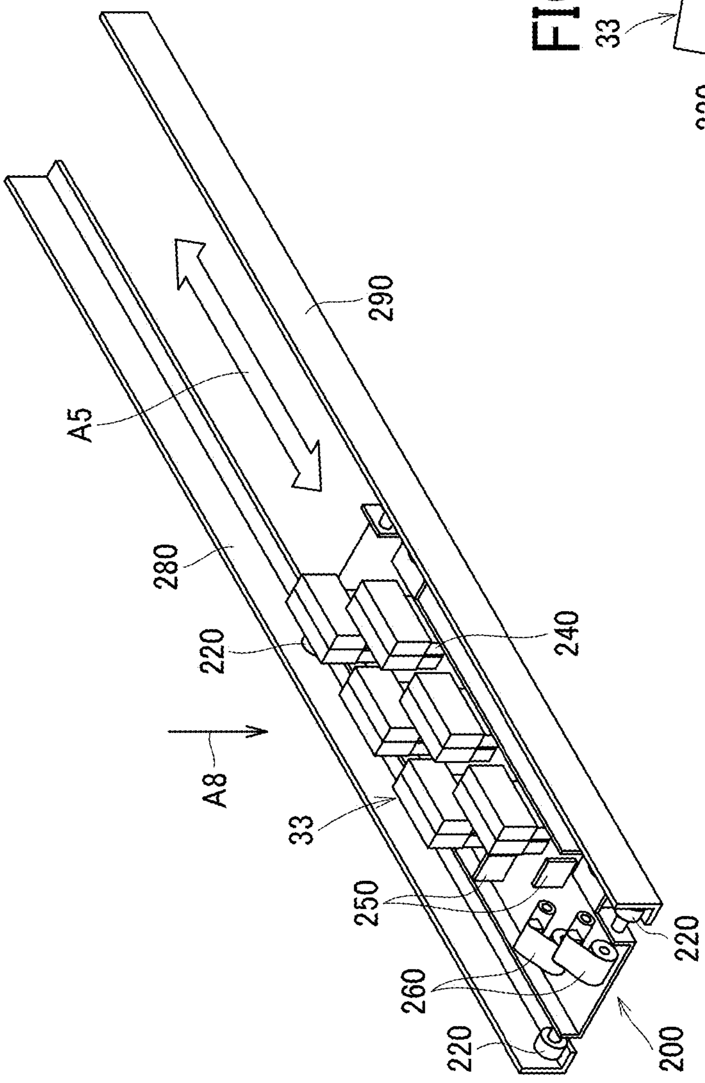
FIGS. 9E and 9F are a perspective view and a front view of the liquid discharge devices at lifted positions and the nozzle surface recovery device at a capping position, respectively.
Figure 9F:
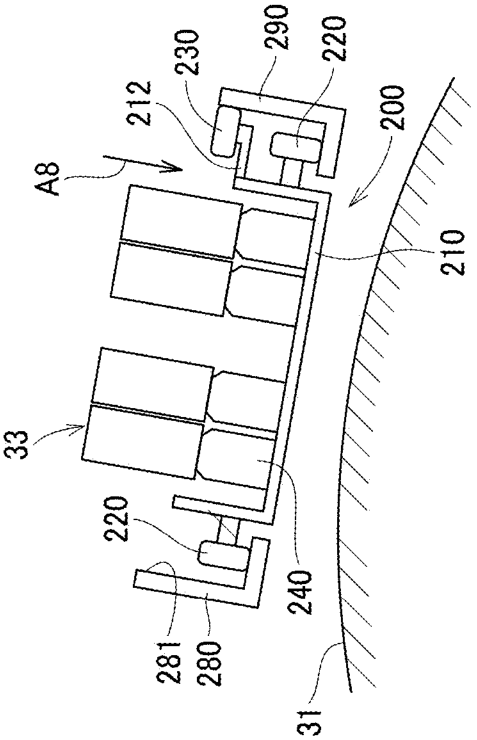

When the forward movement of the nozzle surface recovery device 200 is completed, the liquid discharge devices 33 are slightly lowered in an A8 direction as illustrated in FIGS. 9E and 9F. As a result, the caps 240 of the nozzle surface recovery device 200 can be attached to and cover the respective nozzle surfaces 101 of the liquid discharge devices 33 without any gap.

The nozzle surfaces 101 and the caps 240 may be aligned beforehand by the first position adjuster 300 illustrated in FIGS. 7A and 7B described above, or by the second position adjuster 400 illustrated in FIGS. 8A and 8B described above. As the height of the first rollers 220 disposed at the four corners of the nozzle surface recovery device 200 can be adjusted by the first position adjuster 300, the nozzle surfaces 101 and the caps 240 can be accurately aligned in the height direction. Also, as the second rollers 230 disposed on one side of the nozzle surface recovery device 200 can be laterally moved and adjusted by the second position adjuster 400, the caps 240 can be accurately aligned in a direction parallel to the nozzle surfaces 101.

Figure 9G:
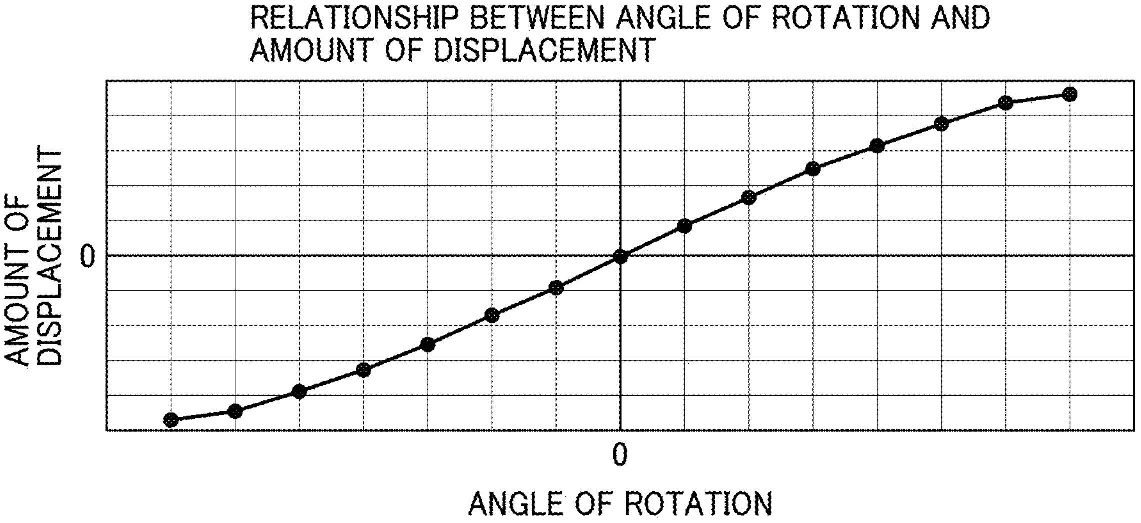
FIG. 9G is a graph illustrating the relationship between the angle of rotation of first adjustment plates and the amount of displacement of first rollers.

When the height of the first rollers 220 is adjusted, it is possible to smoothly adjust the height by taking advantage of the relationship between the angle of rotation of the first adjustment plates 221 and the amount of displacement of the first rollers 220 illustrated in FIG. 9G. The relationship between the angle of rotation and the amount of displacement varies depending on the eccentricity of the rotating shafts of the first rollers 220. As the eccentricity increases, the slope of the curve in FIG. 9G becomes steeper.

The straight line portion at the center of the curve in FIG. 9G can be expressed by an approximation equation (the amount of displacement=the angle of ax rotation, "a" being a constant). Accordingly, by forming the adjustment scale 211*a* in the form corresponding to the necessary amount of movement (the amount of displacement) of the first rollers 220, it is possible to promptly adjust the first rollers 220 to the target amount of movement. Likewise, the adjustment scale 210*a* of the second position adjuster 400 can also be formed in the form corresponding to the necessary amount of movement (the amount of displacement) of the second rollers 230.

In a state where the caps 240 are attached to and cover the nozzle surfaces 101 of the liquid discharge devices 33 as illustrated in (a) and (b) of FIG. 9C, the waste liquid pump connected to the caps 240 is operated, and ink is discharged from the nozzles into the caps 240. As a result, the nozzle surface recovery (cleaning) process can be performed by sucking excessive ink and foreign matters on the nozzle surfaces 101. The discharged ink is sent to the waste liquid tank via the waste liquid pump.

When the nozzle surface recovery process is completed, the nozzle surface recovery device 200 is retracted to the original retraction position by procedures that are the reverse of the procedures described above. The liquid discharge devices 33 are then lowered as illustrated in FIG. 9A, and are set in a printable state.

In a case where the inkjet printer 1 is not used for a long period of time, the nozzle surface recovery device 200 is moved forward to the capping position as illustrated in FIG. 9C. The caps 240 are then attached to and cover the nozzle surfaces 101 of the liquid discharge devices 33, to prevent drying of the nozzle surfaces 101.

Although the present embodiment has been specifically described based on embodiments, the present embodiment is not limited to the above, and it is understood that various modifications can be made to it within the scope of the technical idea disclosed in the claims. For example, in the inkjet printer 1 described above, a plurality of heads 100 is arranged in a staggered manner. However, it is also possible to linearly arrange a plurality of heads having a plurality of sloped nozzle rows.

In the above embodiment, the first rollers 220 and the second rollers 230 are used as the guided members. However, the guided members are not necessarily rollers, and guide pins or the like may be used. In short, the guided members may be any members that can slide with low friction along the guide rails 280 and 290 serving as the guide members.

Further, the first and second position adjuster 400*s* are not limited to the embodiment illustrated in FIGS. 7A to 8B. For example, the first rollers 220 may be supported by the second adjustment plates 232 as illustrated in FIGS. 8A and 8B, and the second rollers 230 may be supported by the eccentric shafts 220*a* as illustrated in FIGS. 7A and 7B. In this manner, various mechanisms having similar functions can be adopted as the position adjustment mechanisms.

Figure 10:
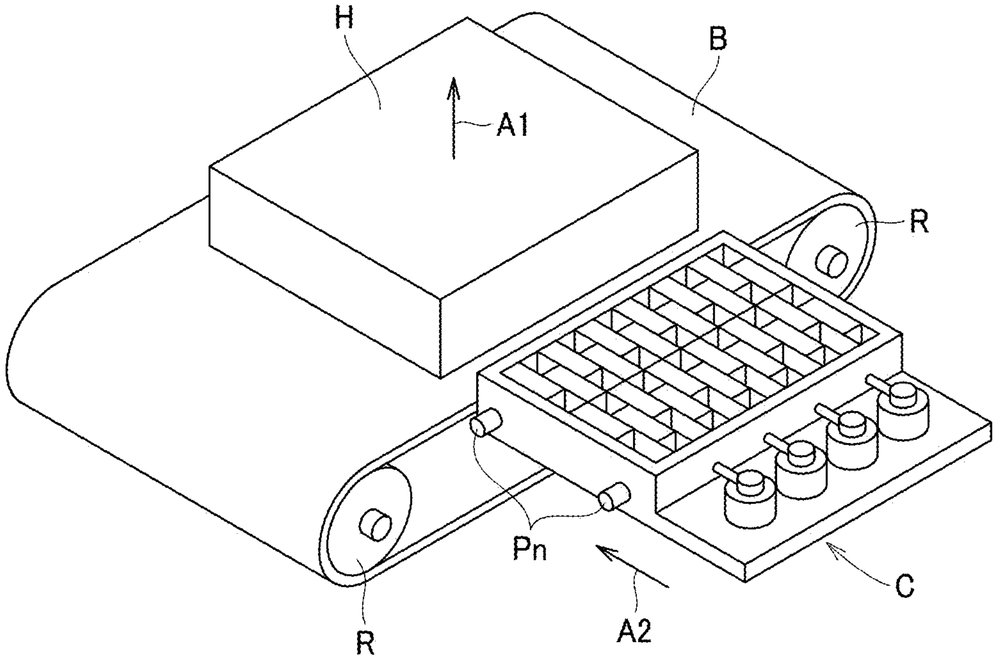
FIG. 10 is a perspective view of liquid discharge devices and a nozzle surface recovery device of a comparative example.

FIG. 10 illustrates a state in which a nozzle surface recovery device C according to a comparative example is at the retraction position. This nozzle surface recovery device C is normally retracted to the front side of a conveyance belt B as illustrated in FIG. 10. When a recovery process is performed on nozzle surfaces 101, a liquid discharge device H is lifted up in an A1 direction, and the nozzle surface recovery device C is then slid in an A2 direction to be located (the capping position) below the liquid discharge device H. In this state, the liquid discharge device H is slightly lowered, and the nozzle surfaces 101 of the liquid discharge device H are pressed against caps of the nozzle surface recovery device C. Thus, a recovery process (cleaning) is performed.

The nozzle surfaces 101 of the liquid discharge device H are positioned with high accuracy. If the accuracy in positioning the nozzle surface recovery device C at the time of the recovery process is low, on the other hand, capping of the nozzle surfaces 101 becomes incomplete, and the recovery process is hindered. The sliding movement of the nozzle surface recovery device C is caused when pins Pn serving as guided members protruding from a side surface of the nozzle surface recovery device C are guided by a guide groove formed in a guide plate. Therefore, it is difficult to achieve a high accuracy in positioning the nozzle surface recovery device C due to dimension errors between components.

Unlike the comparative example, the present embodiment can improve the accuracy in positioning a nozzle surface recovery device by providing position adjustment mechanisms for guided members.

Aspect 1

A nozzle surface recovery device includes: a cap configured to cap a nozzle surface of a liquid discharge head: a guide configured to guide the cap in a first direction; and a first position adjuster configured to adjust a position of the cap with respect to the nozzle surface in a second direction orthogonal to the first direction, and the first position adjuster including: a first roller rotatable along the guide to move the cap in the first direction between a capping position at which the cap caps the nozzle surface and a retraction position at which the cap is retracted from the capping position; and a first adjustment plate coupled to the first roller, the first adjustment plate configured to adjust the position of the cap with respect to the guide in the second direction.

Aspect 2

The nozzle surface recovery device according to Aspect 1, further includes: a second position adjuster including: a second roller rotatable along the guide to move the cap in the first direction between the capping position and the retraction position; and a second adjustment plate coupled to the second roller, the second adjustment plate configured to adjust the position of the cap with respect to the guide in a third direction orthogonal to the first direction and the second direction.

Aspect 3

In the nozzle surface recovery device according to Aspect 2, the first position adjuster is adjustable a height of the cap with respect to the nozzle surface in the second direction, and the second position adjuster is adjustable a positional shift of the cap with respect to the nozzle surface in the third direction.

Aspect 4

In the nozzle surface recovery device according to Aspect 3, the first position adjuster includes: an eccentric shaft connecting the first roller and the first adjustment plate, and the first adjustment plate is rotated to rotate the eccentric shaft to adjust the height of the cap with respect to the nozzle surface in the second direction.

Aspect 5

In the nozzle surface recovery device according to Aspect 4, the first position adjuster has a scale indicating an amount of rotation of the eccentric shaft.

Aspect 6

In the nozzle surface recovery device according to Aspect 3, the second adjustment plate of the second position adjuster is movable in the first direction to adjust the positional shift of the cap with respect to the nozzle surface in the third direction.

Aspect 7

In the nozzle surface recovery device according to Aspect 6, the second adjustment plate has a sloped side in sliding contact with a plate guide, and the sloped side of the second adjustment plate is movable along the plate guide in the first direction.

Aspect 8

In the nozzle surface recovery device according to Aspect 7, the second position adjuster has a scale indicating an amount of movement of the second adjustment plate.

Aspect 9

The nozzle surface recovery device according to Aspect 3, further includes a substrate on which the cap is mounted, the substrate including side plates on both sides of the substrate in the third direction. The first roller includes multiple rollers, the multiple roller are attached to the side plates of the substrate, and the guide includes two guide rails disposed parallel with each other to guide the multiple rollers in the first direction.

Aspect 10

In the nozzle surface recovery device according to Aspect 9, further includes: an elastic member configured to push the substrate toward one of the two guide rails in the third direction. The second roller is attached to one of the side plates of the substrate and rotates to move along said one of the two guide rails in the first direction.

Aspect 11

A liquid discharge device includes: a liquid discharge head configured to discharge a liquid from a nozzle in the nozzle surface; and the nozzle surface recovery device according to Aspect 2.

Aspect 12

An inkjet printer includes the liquid discharge device according to Aspect 11, and the liquid discharge bead includes multiple heads arrayed in a direction orthogonal to each of the first direction and the second direction.

Aspect 13

The inkjet printer according to Aspect 12, further includes: a drum configured to hold a recording medium on a peripheral surface of the drum and rotate to convey the recording medium, and the nozzle surface recovery device includes multiple nozzle surface recovery devices, and the multiple heads and the multiple nozzle surface recovery devices are radially disposed to face an outer periphery of the drum.

Aspect 14

In the inkjet printer according to Aspect 13, the second roller is disposed on one side in a direction of gravity of the plurality of the nozzle surface recovery devices arranged radially.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A nozzle surface recovery device comprising:
a cap to cap a nozzle surface of a liquid discharge head;
a guide to guide the cap in a first direction;
a first position adjuster to adjust a position of the cap with respect to the nozzle surface in a second direction orthogonal to the first direction, the first position adjuster including:
a first roller rotatable along the guide to move the cap in the first direction between a capping position at which the cap caps the nozzle surface and a retraction position at which the cap is retracted from the capping position, and
a first adjustment plate coupled to the first roller, the first adjustment plate to adjust the position of the cap with respect to the guide in the second direction; and
a second position adjuster including:
a second roller rotatable along the guide to move the cap in the first direction between the capping position and the retraction position, and
a second adjustment plate coupled to the second roller, the second adjustment plate to adjust the position of the cap with respect to the guide in a third direction orthogonal to the first direction and the second direction.

2. The nozzle surface recovery device according to claim 1, wherein:
the first position adjuster is adjustable a height of the cap with respect to the nozzle surface in the second direction, and
the second position adjuster is adjustable a positional shift of the cap with respect to the nozzle surface in the third direction.

3. The nozzle surface recovery device according to claim 2, wherein:
the first position adjuster includes an eccentric shaft connecting the first roller and the first adjustment plate, and
the first adjustment plate is rotated to rotate the eccentric shaft to adjust the height of the cap with respect to the nozzle surface in the second direction.

4. The nozzle surface recovery device according to claim 3,
wherein the first position adjuster has a scale indicating an amount of rotation of the eccentric shaft.

5. The nozzle surface recovery device according to claim 2,
wherein the second adjustment plate of the second position adjuster is movable in the first direction to adjust the positional shift of the cap with respect to the nozzle surface in the third direction.

6. The nozzle surface recovery device according to claim 5, wherein:
the second adjustment plate has a sloped side in sliding contact with a plate guide, and
the sloped side of the second adjustment plate is movable along the plate guide in the first direction.

7. The nozzle surface recovery device according to claim 6,
wherein the second position adjuster has a scale indicating an amount of movement of the second adjustment plate.

8. The nozzle surface recovery device according to claim 2, further comprising:
a substrate on which the cap is mounted, the substrate including side plates on both sides of the substrate in the third direction,
wherein;
the first roller includes multiple rollers,
the multiple roller are attached to the side plates of the substrate, and
the guide includes two guide rails disposed parallel with each other to guide the multiple rollers in the first direction.

9. The nozzle surface recovery device according to claim 8, further comprising:
an elastic to push the substrate toward one of the two guide rails in the third direction,
wherein the second roller is attached to one of the side plates of the substrate and rotates to move along said one of the two guide rails in the first direction.

10. A liquid discharge device comprising:
a liquid discharge head to discharge a liquid from a nozzle in the nozzle surface; and
the nozzle surface recovery device according to claim 1.

11. An inkjet printer comprising the liquid discharge device according to claim 10, wherein the liquid discharge head comprising multiple heads arrayed in a direction orthogonal to each of the first direction and the second direction.

12. The inkjet printer according to claim 11, further comprising:

a drum to hold a recording medium on a peripheral surface of the drum and rotate to convey the recording medium, wherein:

the nozzle surface recovery device comprises multiple nozzle surface recovery devices, and the multiple heads and the multiple nozzle surface recovery devices are radially disposed to face an outer periphery of the drum.

13. The inkjet printer according to claim 12, wherein the second roller is disposed on one side in a direction of gravity of the plurality of the nozzle surface recovery devices arranged radially.

14. A nozzle surface recovery device comprising:

a cap to cap a nozzle surface of a liquid discharge head;

a guide to guide the cap in a first direction;

first position adjustment means for adjusting a position of the cap with respect to the nozzle surface in a second direction orthogonal to the first direction, the first position adjustment means including:

first means for rolling which is rotatable along the guide to move the cap in the first direction between a capping position at which the cap caps the nozzle surface and a retraction position at which the cap is retracted from the capping position, and first adjustment means coupled to the first means for rolling, the first adjustment means for adjusting the position of the cap with respect to the guide in the second direction; and second position adjustment means for adjusting including:

second means for rolling which is rotatable along the guide to move the cap in the first direction between the capping position and the retraction position, and second adjustment means coupled to the second means for rolling, the second adjustment means for adjusting the position of the cap with respect to the guide in a third direction orthogonal to the first direction and the second direction.

15. The nozzle surface recovery device according to claim 14, wherein:

the first position adjustment means is adjustable a height of the cap with respect to the nozzle surface in the second direction, and the second position adjustment means is adjustable a positional shift of the cap with respect to the nozzle surface in the third direction.

16. The nozzle surface recovery device according to claim 15, wherein:

the first position adjustment means includes an eccentric shaft connecting the first means for rolling and the first adjustment means, and the first adjustment means is rotated to rotate the eccentric shaft to adjust the height of the cap with respect to the nozzle surface in the second direction.

17. The nozzle surface recovery device according to claim 16, wherein the first position adjustment means has a scale indicating an amount of rotation of the eccentric shaft.

18. The nozzle surface recovery device according to claim 15, wherein the second adjustment means of the second position adjustment means is movable in the first direction to adjust the positional shift of the cap with respect to the nozzle surface in the third direction.

19. The nozzle surface recovery device according to claim 18, wherein:

the second adjustment means has a sloped side in sliding contact with a plate guide, and the sloped side of the second adjustment means is movable along the plate guide in the first direction.

20. The nozzle surface recovery device according to claim 19, wherein the second position adjustment means has a scale indicating an amount of movement of the second adjustment means.

* * * * *